March 19, 1957 B. PHILLIPS 2,785,445
PLASTIC AWNING CONSTRUCTION
Filed Jan. 14, 1953 3 Sheets-Sheet 1
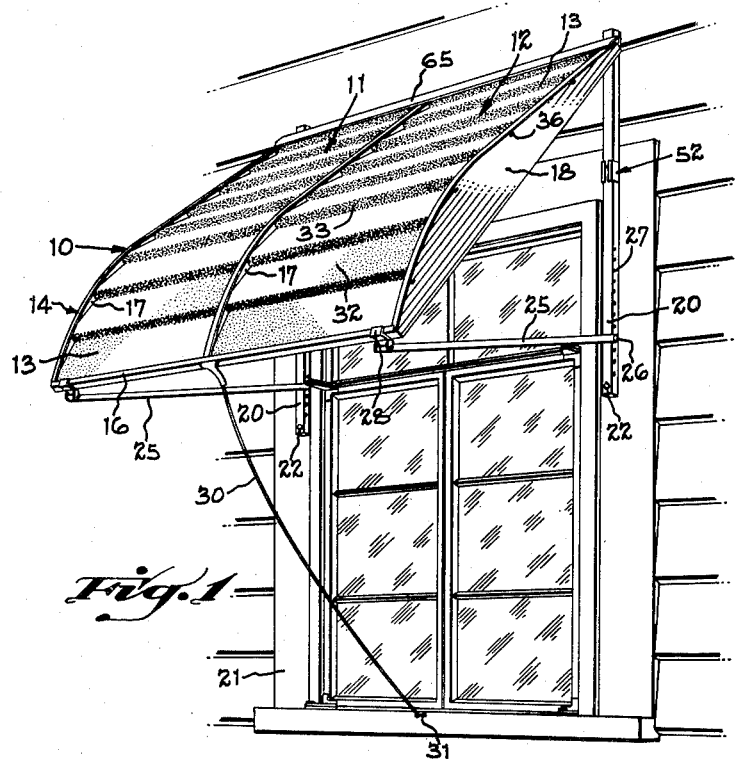
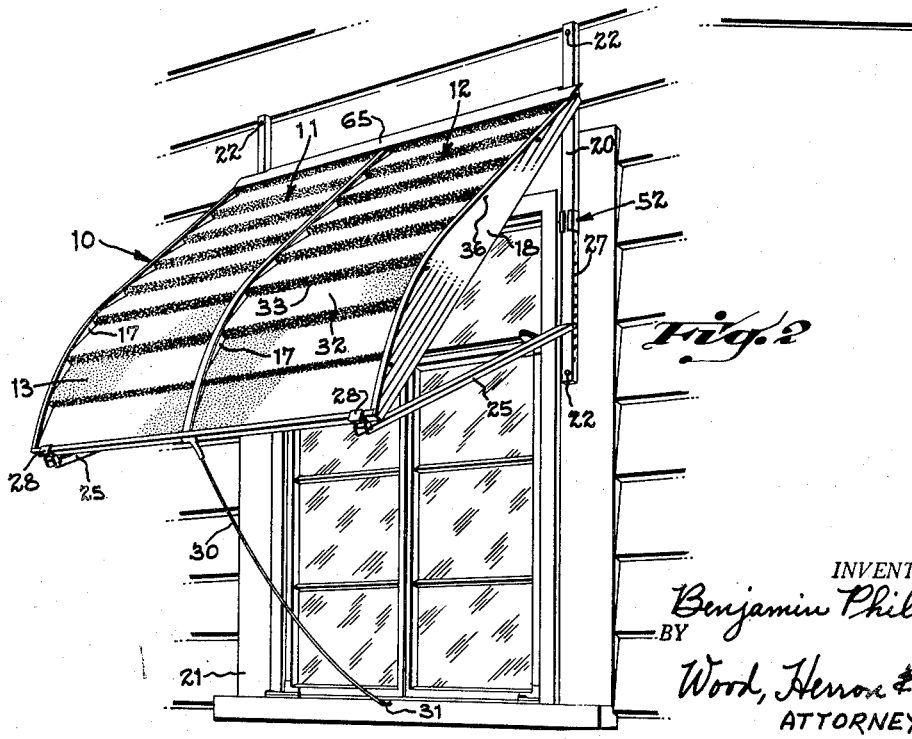
INVENTOR.
Benjamin Phillips.
BY
Wood, Herron & Evans.
ATTORNEYS.

March 19, 1957  B. PHILLIPS  2,785,445
PLASTIC AWNING CONSTRUCTION
Filed Jan. 14, 1953  3 Sheets-Sheet 2
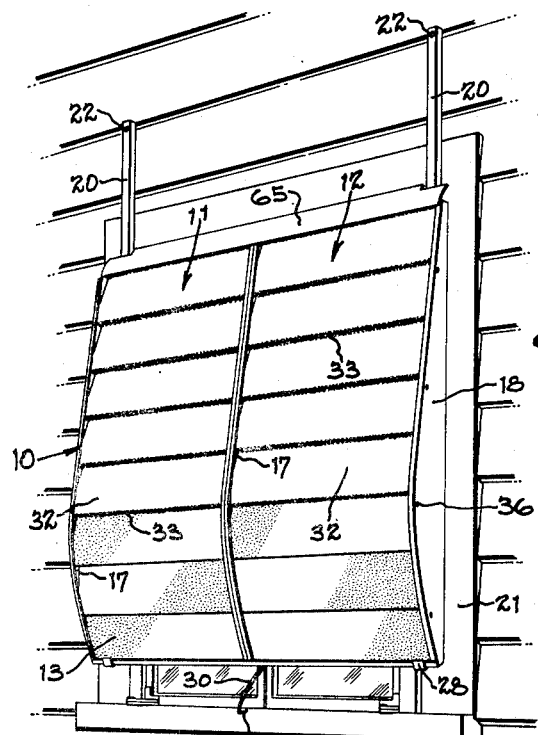
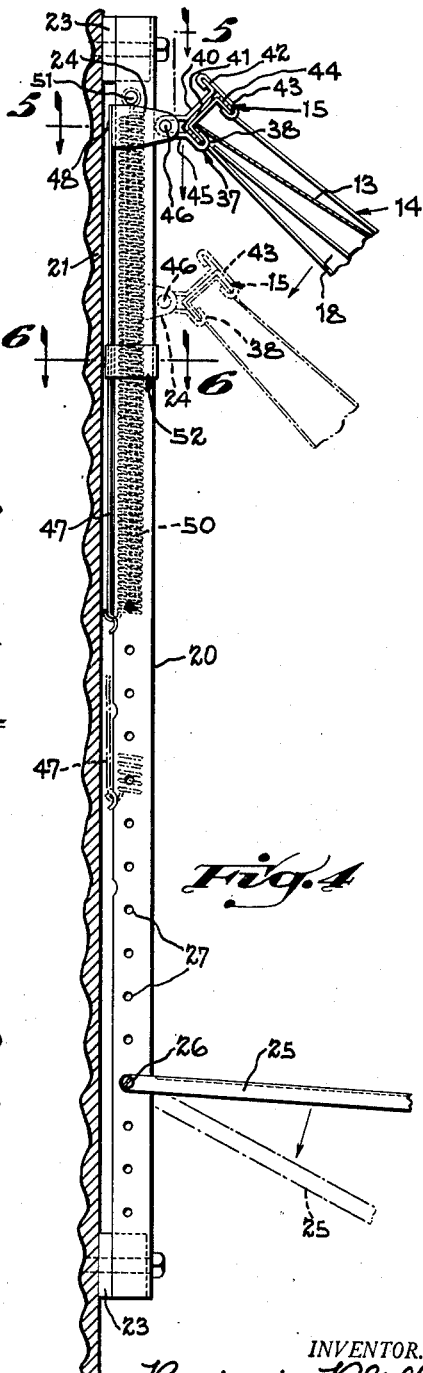
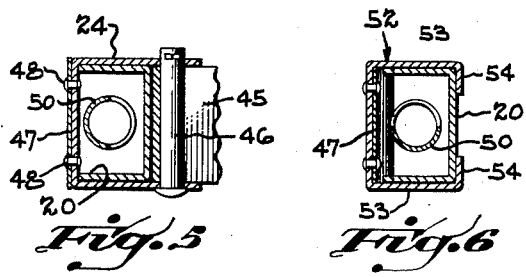
INVENTOR.
Benjamin Phillips.
BY Wood, Herron & Evans.
ATTORNEYS.

March 19, 1957 B. PHILLIPS 2,785,445
PLASTIC AWNING CONSTRUCTION
Filed Jan. 14, 1953 3 Sheets-Sheet 3
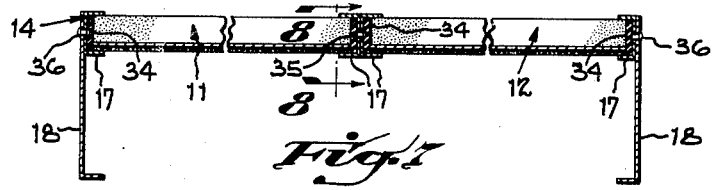
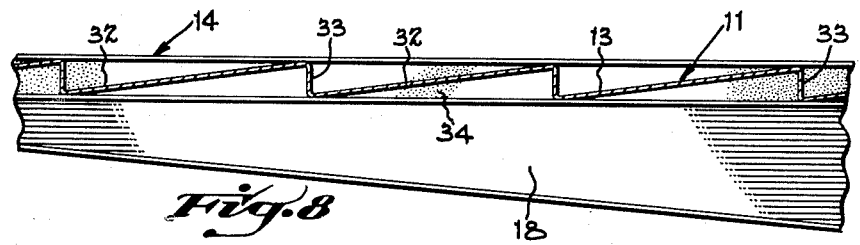
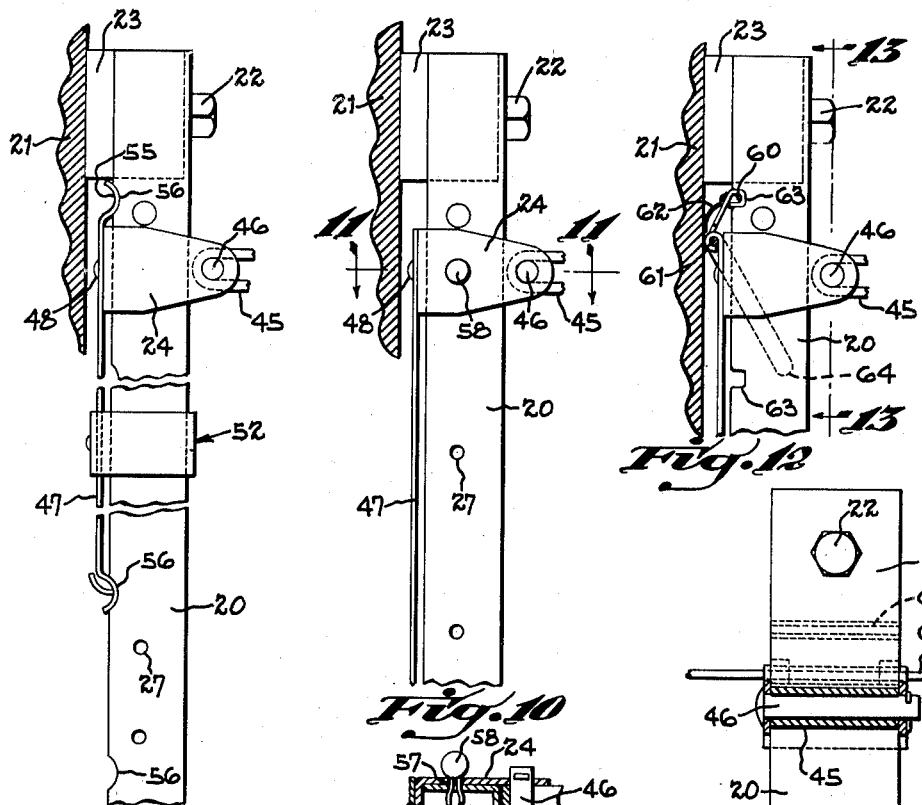
INVENTOR.
Benjamin Phillips,
BY
Wood, Herron & Evans.
ATTORNEYS.

United States Patent Office 2,785,445
Patented Mar. 19, 1957

2,785,445

PLASTIC AWNING CONSTRUCTION

Benjamin Phillips, Cincinnati, Ohio

Application January 14, 1953, Serial No. 331,185

12 Claims. (Cl. 20—57.5)

This invention relates to awnings, and is particularly directed to an awning of the rigid or non-canvas type. The principal object of the present invention is to provide a rigid awning of sectional construction which can readily be assembled and mounted over windows of various widths. The present awning construction includes a plurality of awning sections bolted together to form a rigid unit, supporting members joined to a wall at the opposite sides of a window, and novel means for adjustably securing the awning to the support members, whereby an assembled awning unit can quickly and easily be secured upon support members of different spacings.

It is a further object of this invention to provide a rigid awning which can be raised or lowered, and can be selectively positioned as to its angle, or pitch. Preferably, the awning can be shifted from a fully, or partially opened position, to one in which it completely covers the window, and is thereby effective to serve as a shutter for protecting the dwelling against damage occasioned by high winds and severe storms.

The provision of means for adjusting the position of the awning makes it particularly advantageous for use with casement windows of the type which open outwardly. When used with such windows, the awning may be raised and rotated outwardly whenever the windows are open. As a result, a much smaller awning having considerably less arch may be employed than would be the case if the awning were rigidly positioned and had to be of sufficient size to clear the window in its open position.

More specifically, the present invention is predicated upon the concept of providing an awning section constituted by a panel formed of a translucent material such as a colored plastic, and surrounded by a channel preferably formed of some light metal such as aluminum. The desired number of panels are secured together in lateral juxtaposition to form an awning of the required width. The awning assembly is mounted upon two vertical support members which are secured to the wall of a building in parallel spaced relationship adjacent to the window to be covered.

The upper end of the awning is pivotally joined to two mounting brackets, each of the mounting brackets slideably engaging one of the support members. The lower end of the awning is supported by two arms, one end of the arm being pivotally secured to the awning, and the other end of the arm being joined to the support members.

The awning is raised or lowered by sliding the mounting brackets up or down over the support members, and its pitch or angular position is altered by rotating it about the brackets while changing the points at which the lower arms are secured to the support members. These two adjustments can be combined to provide a wide variety of available awning positions. Suitable stabilizing means are provided for holding the awning in any desired position.

One of the principal features of the present awning is that the two vertical support members can be spaced apart at whatever distance best suits any particular window and building construction. To accommodate variations in support member spacing, a novel clip arrangement is provided for joining the top of the awning to the mounting brackets which slideably engage the support members. By means of the clip arrangement which will be described in detail below, the mounting brackets can readily be secured to the top of the awning at any desired point.

Other advantages of the present invention will be apparent from a consideration of the following detailed description of the drawings showing a preferred embodiment of the invention.

In the drawings:

Figure 1 is a perspective view showing the awning in a completely raised position.

Figure 2 is a view similar to Figure 1 showing the awning in a partially raised position.

Figure 3 is a view similar to Figure 1 showing the awning in a completely closed position in which it functions as a storm shutter.

Figure 4 is a side elevational view of a support member showing a part of the awning in cross section.

Figure 5 is a cross sectional view taken along line 5—5 of Figure 4.

Figure 6 is a cross sectional view taken along line 6—6 of Figure 4.

Figure 7 is a transverse cross sectional view of the awning.

Figure 8 is an enlarged cross sectional view taken along line 8—8 of Figure 7.

Figure 9 is an elevational view of a modification of the mounting bracket and stabilizing means.

Figure 10 is a side elevational view of still another modification of the mounting bracket and stabilizing means.

Figure 11 is a cross sectional view taken along line 11—11 of Figure 10.

Figure 12 is a side elevational view of a third modification of the mounting bracket and stabilizing means.

Figure 13 is a cross sectional view taken along line 13—13 of Figure 12.

Figure 1 shows a typical awning 10 constructed in accordance with this invention. In the embodiment shown, the awning comprises two sections, 11 and 12, which are joined together in side by side relationship. Each section includes a panel 13, preferably formed of a translucent plastic material, and a metal frame 14 surrounding the panel. The frame 14 comprises top and bottom channel members 15 and 16, and side channel members 17. An end member 18 is secured to the two channel members at each end of the awning. It will be understood that more than two sections may be employed if an awning is to span a wider window than the one shown. The construction of the individual sections, and the manner in which they are assembled, will be discussed in greater detail below in conjunction with the description of Figures 4, 7 and 8.

The awning is mounted over a window by means of two vertical support members 20 which are secured to the building adjacent to a window frame 21 in any suitable manner; for example, by means of bolts 22 which are anchored in the wall and pass outwardly through spacer blocks 23 and supports 20. Preferably the support members are formed from lengths of channel bar, and have a generally U-shaped cross section. The open edge of the channel faces inwardly, and is spaced from the building by the width of blocks 23.

The upper edge of the frame is pivotally joined to two mounting brackets 24, as best shown in Figure 4. The mounting brackets 24 are adapted for vertical sliding movement along supports 20. The lower edge of the awning is supported by two arms 25, the arms being pivotally joined to supports 20 by means of pins 26 passing through apertures 27 in the support members. The outer edge of the arm is pivotally joined to the lower edge of the frame by means of a suitable clip such as clip 28.

As shown in Figures 1-3, the awning is vertically adjustable so that it may be raised or lowered with respect to the window. Furthermore, the awning is pivotally adjustable, and can be rotated from a completely open position as shown in Figure 1, to an intermediate position shown in Figure 2, or into a completely closed position as shown in Figure 3. In this latter position, the awning covers the window and forms a storm shutter for protection against high winds, storms and the like. As shown, a rope 30 is secured to the lower edge of the awning channel member 16, and to a suitable hook 31 secured to the window sill. This rope may be used to pull the awning downwardly into the desired position.

The details of construction of the sections, support members and mounting brackets, are shown in Figures 4 through 8. As there shown, each section includes a box-like frame 14, including two arcuate side channels 17, a top channel 15 and a bottom channel 16. Mounted within the channels is a panel 13 which is preferably constructed of some translucent material such as a colored plastic. The panels are of a stepped configuration including a plurality of flat lateral surfaces 32 offset from one another, and interconnected by narrow risers 33.

The opening in each of the side channels is of substantially the same size as the height of risers 33, so that the plastic panel 13 can be wedged in the channels and made to assume the overall arcuate configuration of the channels. A mastic compound 34, preferably in the form of a strip of mastic tape, is placed within the channel at the edge of the plastic panel. This mastic compound provides a seal between the channel and plastic panel, and prevents any rattling of the panel.

When it is desired to join two or more sections together, the sections are aligned so that their two side channels are in abutting relationship. The two adjacent channels are then secured together in any suitable manner as by means of bolts or rivets 35. Next, top and bottom channel members of a length sufficient to extend across the assembled sections, joined to the side channels of each section in any suitable manner. After the desired number of sections have been joined, end members 18 are bolted, or otherwise secured, to the two end channels 17 as at 36.

The top channel member carries hinge brackets 37. Each of the brackets includes a U-shaped section 38 embracing one arm of the channel, and an extension 40 in engagement with the back of the channel 41. The extension 40 terminates in a flange 42 adapted for cooperation with a clip 43. The clip 43 is of a generally C-like configuration, one portion of the C fitting over arm 44 of the top channel member, and the other portion of the C fitting over flange 42. The hinge brackets are shifted along channel 15 until the brackets are in the desired position; then clip 43 is forced over arm 44, and flange 42, to hold the bracket in place. The hinge bracket is further provided with a loop 45 for receiving pin 46, by means of which the hinge bracket is pivotally secured to mounting bracket 24.

Mounting bracket 24 is of U-shaped cross section, and is inversely arranged with respect to the support members 20; that is, the closed side of the mounting bracket is disposed adjacent to the open end of the support member, while the arms of the mounting bracket embrace the side walls of the support member, and extend outwardly beyond the support member to receive pin 46.

Suitable stabilizing means are associated with the mounting bracket for holding the awning in any desired position against displacement due to high winds or other causes. One preferred embodiment of the stabilizing means is shown in Figures 4, 5 and in 6, and includes an elongated spring stretcher 47 which is riveted, or otherwise secured, to the mounting bracket as at 48, and extends vertically along the support member. The spring stretcher is preferably formed of a resilient material, one end of which is curved to form an inwardly facing detent adapted for engagement with one of a series of spaced notches formed in the support member. This end is also provided with a suitable opening for receiving one end of tension spring 50. The other end of the tension spring is secured to a bolt 51, passing through the support member at its upper end.

A guide 52 is riveted, or otherwise secured, to the spring stretcher at a point substantially midway between the hinge bracket and the detent end of the stretcher. The guide, as shown in Figure 6, is of substantially rectangular cross section, and includes side arms 53 embracing the side arms of the support member, and angle arms 54 engaging the closed face of the support member 20. The guide performs a double function in that it prevents lateral displacement of the lower end of the spring stretcher, and also is effective to urge the stretcher against the notches in the support member.

Various modifications of the stabilizing device are shown in Figures 9-13. As shown in Figure 9, the spring stretcher 47 extends above the mounting bracket 20 and a detent 55 is formed on this extension at a point close to the bracket. A suitable series of notches 56 are provided in the support member for cooperation with this detent. This arrangement is particularly effective because of the natural tendency of the mounting bracket to cant in a clockwise direction as viewed in Figure 9, so that the upper edge of the bracket is forced inwardly against the support member, and the lower edge is displaced outwardly. With the detent placed above the bracket, this canting tendency causes a firmer engagement between the detent and stop notches.

The modification shown in Figure 10 is generally similar to that shown in Figure 4, except that a plurality of spaced apertures are provided in the side of the support member, and an opening 57 is formed in each of the arms of the mounting bracket 24. These openings are disposed so that they may be brought into registry with the apertures 27 in the support member. Suitable spring clips such as clips 58 are provided for insertion in the aligned openings to hold the mounting bracket in place.

The modification shown in Figures 12 and 13 includes a substantially square detent member 60 which is pivotally mounted on shaft 61, and is spring urged toward the support member 20 by means of spring 62. Again the support member is provided with a plurality of notches 63 for receiving the detent member 60 which can be released from engagement with the notches by turning handle 64, which is secured to shaft 61.

When installing an awning, the two support members 20 are secured to the wall of a building adjacent a window opening by means of bolts 22 and spacer blocks 23. The support members are aligned vertically, and may be mounted extremely close to the window as in the embodiment shown, or may be spaced from it, if this better suits the construction of the building. After the desired number of awning sections have been assembled, as explained above, the hinge brackets are slipped over the upper channels 15, and are shifted along the channels until they are spaced apart a distance equal to the spacing of the support members. When the hinge brackets are properly positioned, a clip 43 is slipped over one arm of the upper channel and flange 42 of each hinge bracket, to hold the hinge brackets in place.

Next, the hinge brackets are joined to the mounting brackets by inserting loop 45 between the arms of the mounting bracket, and passing pin 46 through apertures in the mounting bracket and the loop. Arms 25 are joined to the lower channel member by means of clips 28, and pins 26 are slipped into any suitable aperture 27 in the support members. If desired, suitable flashing 65 may be secured to the upper channel member.

To adjust the awning to any desired position, the stabilizing means are released, that is, the detents are disengaged from the notches in support members 20, or spring clips 58 are removed from the apertures in the mounting brackets and support members. The awning is then pulled downwardly by means of rope 30 against the tension of spring 50 until the top of the awning is in the desired position, and the detents associated with the mounting bracket are in engagement with one of the stop notches in each of the support members. If it is desired to alter the angle or pitch of the awning, each of the pins 26 is removed from its aperture in the support member, and the point of securance of the arm 25 to the support member is shifted by raising or lowering the end of the arm, and then inserting pin 26 through the arm and another of the vertically spaced apertures.

Preferably, the awning can be converted into a storm shutter by bringing the mounting brackets into their lowermost position along the support members while simultaneously shifting the end of arm 25 and pin 26 to their uppermost position so that the lower end of the awning may be pivoted downwardly and inwardly, against the window as shown in Figure 3.

From the foregoing discussion of the general principles of this invention, and the detailed description of a preferred embodiment, it will be apparent to those skilled in the art that various modifications may be made without departing from the scope of this invention.

Having described my invention, I claim:

1. A rigid awning including an upper edge and a lower edge, means for mounting said awning upon a wall over a window opening, said means comprising a pair of support members, said support members being secured to the wall adjacent the window, said support members extending vertically in parallel spaced relationship with one another, mounting brackets slidably engaging said support members, means for hingedly securing the upper edge of said awning to each of said mounting brackets, stabilizing means associated with said mounting brackets for selectively holding said mounting brackets in one of a plurality of vertical positions relative to said support members said stabilizing means including an extensible spring joined to one of said support members and to one of said mounting brackets, and arms for adjustably supporting the lower end of said awning, said arms being pivotally secured to the lower end of said awning, and to said support members.

2. A rigid awning including an upper edge and a lower edge, means for mounting said awning upon a wall over a window opening, said means comprising a pair of support members, said support members being secured to the wall adjacent the window, said support members extending vertically in parallel spaced relationship with one another, mounting brackets slidably engaging said support members, means for hingedly securing the upper edge of said awining to each of said mounting brackets, stabilizing means associated with said mounting brackets for selectively holding said mounting brackets in one of a plurality of vertical positions relative to said support members said stabilizing means including an extensible spring joined to one of support members and to one of said mounting brackets, and arms for adjustably supporting the lower end of said awning, said arms being pivotally secured to the lower end of said awning and to said support members, said arms being adapted for securance to said support members at a plurality of vertically spaced points, whereby the pitch of said awning may be varied by vertically displacing the points of securance of said arms and said support members.

3. A rigid awning including an upper edge and a lower edge, means for mounting said awning upon a wall over a window opening, said means comprising a pair of support members, said support members being secured to the wall adjacent the window, said support members extending vertically in parallel spaced relationship with one another, mounting brackets slidably engaging said support members, means for hingedly securing the upper edge of said awning to each of said mounting brackets, stabilizing means associated with said mounting brackets for selectively holding said mounting brackets in one of a plurality of vertical positions relative to said support members said stabilizing means including an extensible spring joined to one of said support members and to one of said mounting brackets, and arms for adjustably supporting the lower end of said awning, said arms being pivotally secured to the lower end of said awning, and to said support members, said arms being adapted for securance to said support members at a plurality of vertically spaced points, whereby the pitch of said awning may be varied by vertically displacing the points of securance of said arms and said support members, said mounting brackets, and the points of securance of said arms with said support brackets, being shiftable into positions wherein said awning extends vertically in front of said window to form a storm shutter.

4. In a rigid awning, including a top channel extending transversely across said awning, said top channel having two arms and a back, means for mounting said awning upon a wall over a window opening, said means comprising a pair of support members, said support members being secured to the wall adjacent to the window and extending vertically in parallel spaced relationship with one another, mounting brackets slidably engaging said support members, a hinge bracket pivotally secured to said mounting bracket, said hinge bracket including a U-shaped section embracing one arm of said top channel and an extension in abutting relationship with the back of said channel, said extension terminating in a flange, a clip for securing said hinge bracket to said channel, said clip including one portion adapted to embrace said flange, and a second portion adapted to embrace an arm of said top channel.

5. A rigid awning comprising a plurality of sections disposed in lateral juxtaposition, each of said sections including a panel, side channels embracing the side edges of said panel, a top channel, a bottom channel, said top and bottom channels being secured to said side channels to form a substantial rectangular frame surrounding said panel, one side channel of each of said sections abutting a side channel of the adjacent section and being secured thereto, means for mounting said awning upon a wall over a window opening, said means comprising a pair of support members, said support members being secured to the wall adjacent to the window, and extending vertically in parallel spaced relationship with one another, means engaging said top channel intermediate said side channels for securing said awning to said support members, and arms for adjustably supporting the lower end of said awning, said arms being secured to the bottom channel and to said support members.

6. In a rigid awning, including a top channel extending transversely across said awning, said top channel having two arms and a back, means for mounting said awning upon a wall over a window opening, said means comprising a pair of support members, said support members being secured to the wall adjacent to the window, mounting brackets associated with said support members, a hinge bracket adapted for securance to one of said mounting brackets, said hinge bracket including a U-shaped section embracing one arm of said top channel, and an extension in abutting relationship with the back of said channel, said extension terminating in a flange, a clip for securing said hinge bracket to said channel, said clip including one portion adapted to embrace said flange, and a second portion adapted to embrace the other arm of said top channel.

7. A rigid awning comprising a plurality of sections disposed in lateral juxtaposition, each of said sections including a panel, side channels embracing the side edges of said panel, a top channel, a bottom channel, said top and bottom channels being secured to said side channels to form a substantially rectangular frame surrounding said panel, one side channel of each of said sections abutting a side channel of another of said sections, fastening means for securing said channels together, means for mounting said awning upon a wall over a window opening, said means comprising a pair of support members, said support members being secured to the wall adjacent to the window, and extending vertically in parallel spaced relationship with one another, means including a mounting bracket slidably engaging said support members and hinge brackets pivotally secured to said mounting brackets and joined to said top channel for slidably securing said awning to said support members, and arms for adjustably supporting the lower end of said awning, said arms being secured to the bottom channel and to said support members.

8. Means for mounting a rigid awning having an upper edge and a lower edge upon a wall over a window opening, said means comprising a pair of support members, said support members being secured to the wall adjacent to the window and extending vertically in parallel spaced relationship with one another, said support members being lengths of bar of a generally channel-like configuration, mounting brackets slidably engaging said support members, means for pivotally securing the upper edge of said awning to said mounting brackets, stabilizing means for adjustably positioning each of said mounting brackets, said stabilizing means including a spring disposed within the channel of said support member, one end of said spring being secured to said support member, the opposite end of said spring depending therefrom, means interconnecting said opposite end of said spring and said mounting bracket, said support members being configurated to form a plurality of vertically spaced notches, a detent associated with said mounting bracket disposed for selective engagement with one of said spaced notches.

9. Means for mounting a rigid awning having an upper edge and a lower edge upon a wall over a window opening, said means comprising a pair of support members, said support members being secured to the wall adjacent to the window, and extending vertically in parallel spaced relationship with one another, said support members being of a generally channel-like configuration, mounting brackets slidably engaging said support members, means for pivotally securing the upper edge of said awning to said mounting brackets, stabilizing means for adjustably positioning each of said mounting brackets, said stabilizing means including a spring disposed within the channel of said support member, one end of said spring being secured to said support member, the other end of said spring depending therefrom, a spring stretcher secured to said mounting bracket and to the depending end of said spring, said support members being configurated to form a plurality of vertically spaced notches, a detent formed on said spring stretcher and disposed for selective engagement with one of said spaced notches.

10. Means for mounting a rigid awning having an upper edge and a lower edge upon a wall over a window opening, said means comprising a pair of support members, said support members being secured to the wall adjacent to the window, and extending vertically in parallel spaced relationship with one another, said support members being of a generally channel-like configuration, mounting brackets slidably engaging said support members, means for pivotally securing the upper edge of said awning to said mounting brackets, stabilizing means for adjustably positioning each of said mounting brackets, said stabilizing means including a spring disposed within the channel of said support member, one end of said spring being secured to said support member, the other end of said spring depending therefrom, a spring stretcher secured to said mounting bracket and to the depending end of said spring, said support members being configurated to form a plurality of vertically spaced notches, said spring stretcher having an extension disposed above said mounting bracket, a detent formed on said extension and adapted for selective engagement with one of said notches.

11. Means for mounting a rigid awning having upper edge and a lower edge upon a wall over a window opening, said means comprising a pair of support members, said support members being secured to the wall adjacent to the window, and extending vertically in parallel spaced relationship with one another, said support members being of a generally channel-like configuration, mounting brackets slidably engaging said support members, means for pivotally securing the upper edge of said awning to said mounting brackets, stabilizing means for adjustably positioning each of said mounting brackets, said stabilizing means including a spring disposed within the channel of said support member, one end of said spring being secured to said support member, the other end of said spring depending therefrom, a spring stretcher secured to said mounting bracket and to the depending end of said spring, said support members being configurated to form a plurality of vertically spaced notches, a detent member, means urging said detent member into engagement with said notches, means for rotatably shifting said detent member for disengaging it from said notches.

12. Means for mounting a rigid awning having an upper edge and a lower edge upon a wall over a window opening, said means comprising a pair of support members, said support members being secured to the wall adjacent to the window, and extending vertically in parallel spaced relationship with one another, said support members being of a generally channel-like configuration, mounting brackets slidably engaging said support members, means for pivotally securing the upper edge of said awning to said mounting brackets stabilizing means for adjustably positioning each of said mounting brackets, said stabilizing means including a spring, one end of said spring being secured to said support member, the other end of said spring depending therefrom, means interconnecting said depending end of said spring and said mounting bracket, each of said mounting brackets being configurated to form apertures therein, said support members being configurated to form a plurality of vertically spaced apertures, a spring clip adapted for insertion through the apertures in said mounting bracket and said channel member.

References Cited in the file of this patent
UNITED STATES PATENTS

| | | |
|---|---|---|
| 752,348 | Lutts | Feb. 16, 1904 |
| 1,524,237 | Grammas | Jan. 27, 1925 |
| 1,902,879 | Miller | Mar. 28, 1933 |
| 1,956,850 | Bishop et al. | May 1, 1934 |
| 2,015,305 | Grayson | Sept. 24, 1935 |
| 2,526,168 | Spear | Oct. 17, 1950 |
| 2,549,201 | Hunter | Apr. 17, 1951 |
| 2,597,633 | Graham | May 20, 1952 |
| 2,644,207 | McCormack et al. | July 7, 1953 |
| 2,647,291 | Russell et al. | Aug. 4, 1953 |